Nov. 24, 1959   J. HIBBEN, JR., ET AL   2,914,336
COLLAPSIBLE GOLF BAG CART
Filed June 11, 1956   3 Sheets-Sheet 1
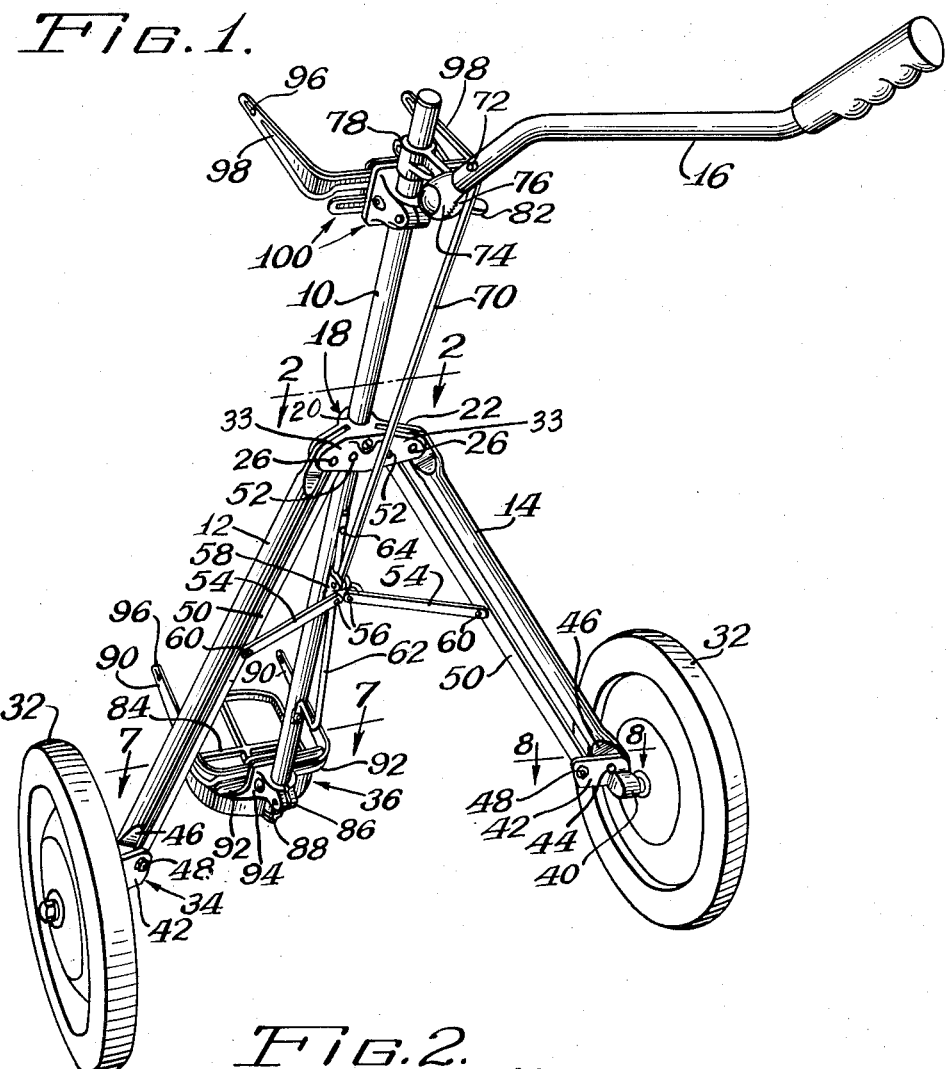
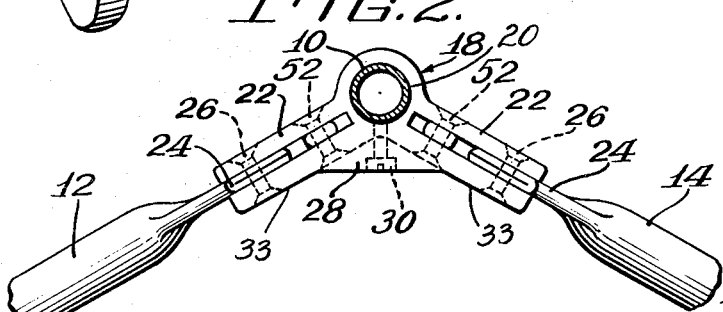
Inventors:
John Hibben, Jr.
Bill B. Kunkel
By Atty.

Nov. 24, 1959 J. HIBBEN, JR., ET AL 2,914,336
COLLAPSIBLE GOLF BAG CART
Filed June 11, 1956 3 Sheets-Sheet 2

Inventors:
John Hibben, Jr.
Bill B. Kunkel
By Warren C. Horton Atty.

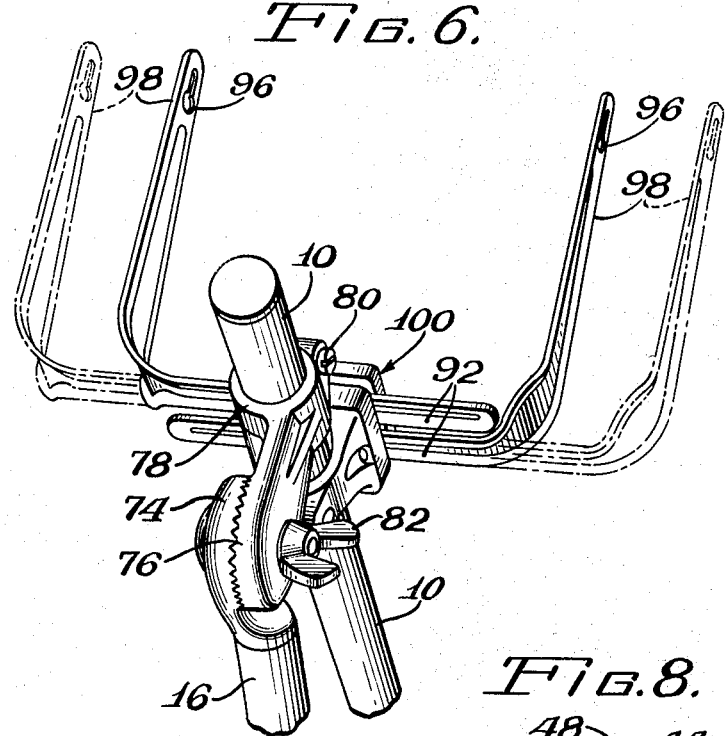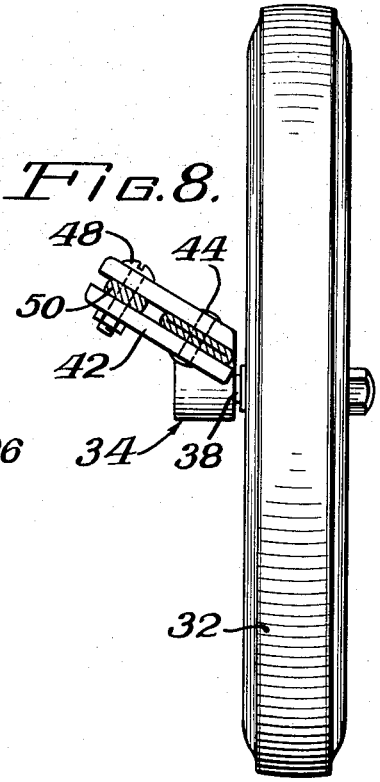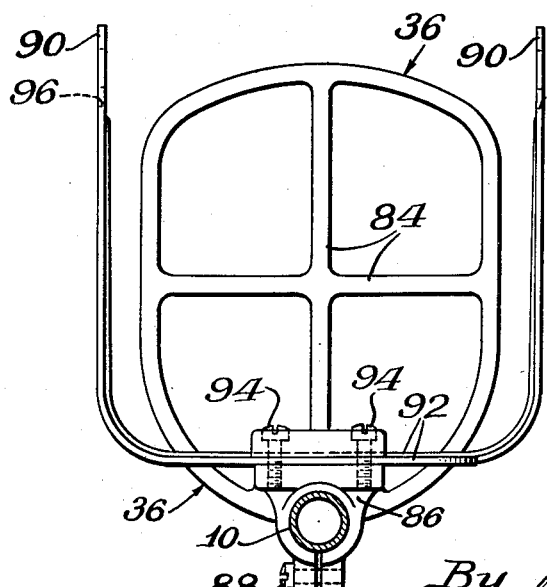

2,914,336
COLLAPSIBLE GOLF BAG CART

John Hibben, Jr., Chicago, and Bill B. Kunkel, Schiller Park, Ill., assignors to Kunkel Industries, Inc., Chicago, Ill., a corporation of Illinois Application June 11, 1956, Serial No. 590,750

5 Claims. (Cl. 280—42)

The present invention relates to golf bag carriages of the type commonly employed for supporting and transporting golf bags while in use on golf courses.

The invention is particularly concerned with that class of golf bag carriers which are commonly known as tripod carts and which involve in their general organization a main frame member and a pair of side frame members pivoted for swinging movement relative to the former and carrying at their lower ends a pair of traction wheels. The main frame member carries at its lower end a combined foot member and golf bag platform and the side members are capable of swinging movement from retracted positions in close coextensive proximity to the main frame member to extended positions wherein the three frame members, together with their attached wheels and foot member, constitute in effect a tripod so that the thus erected cart may have a three point support on the ground in the manner of a stand for display, selection, removal and reinsertion of the golf clubs from and into the bag. The cart is further provided with a handle bar by which it may be maneuvered tractionally with the bag in a more or less horizontal position and the handle bar serves functionally, at will, as a drawbar which operates through a pair of toggle or spreader links automatically to collapse the side frame members upon the main frame member and reduce the cart to relatively small dimensions so that the same may conveniently be transported in an automobile or so that a large number of the carts may be stored when not in use within a relatively small compass.

Heretofore golf bag carts of the character briefly outlined above have possessed certain limitations principal among which is the difficulty of properly designing the toggle linkage system so that there will be no frictional drag on the pivotal connections therefor due to the application of torsional stresses when the parts are moved from one position to another. Where the tripod frame members are designed to swing in planes which extend at angles of 120° from one another, which is the ideal arrangement for any tripod support, it is customary to employ a three-way toggle joint or spreader link construction and this poses the difficulty of designing a suitable multiple connection for the adjacent ends of the various links as well as a pivotal connection for the drawbar. Carts which are so designed not only have a multiplicity of moving parts but, additionally, the free space beneath the cart frame members is encumbered with linkage mechanism which frequently presents an obstruction to passage of the drawn cart over small shrubs or other obstacles on or near the fairway. Where attempts have been made to utilize a two-way toggle joint or spreader link construction with the adjacent ends of the two toggle links connected to the main frame member, torsional stresses are set up in the toggle links which require extremely loose connections at the ends of the toggle links or swivel connections at these points or within the toggle arms themselves. Such connections are, in the main, undesirable inasmuch as they contribute toward looseness between the various parts involved with consequent rattling of the frame parts when the cart is in motion, as well as being costly and requiring frequent attention.

The present invention is designed to overcome the above noted limitations that are attendant upon the construction and use of golf bag carts utilizing two-way toggle joints between the three tripod frame members and, toward this end, it contemplates the provision of such a cart in which an end of each of the two toggle or spreader links is securely pivoted to one of the side frame members and in which the joints between the links and frame members are devoid of swivel or other lost motion connections. According to the present invention, torsional stresses in the linkage mechanism and particularly in the toggle links are avoided by the utilization of novel means for guiding the adjacent ends of the links and the attached end of the drawbar through a path of movement which is the normal locus of movement of these ends of the links.

Another limitation that is attendant upon the construction and use of tripod carts utilizing two-way toggle linkage mechanism resides in the control instrumentalities for maintaining a proper or predetermined caster angle for the wheel axles. Some carts maintain a fixed caster angle between each wheel and its side frame member and, although this may eliminate the use of a considerable amount of linkage mechanism, it appreciably limits the extent to which the cart may be folded or collapsed inasmuch as in its folded condition the respective planes of the wheels are not maintained in parallelism. Furthermore, the collapsed cart is unstable and when placed on the ground it tends to roll to one side. Such carts as are equipped with means for maintaining a constant caster angle for the wheels during collapse of the framework invariably have relatively long axle supports or housings which limit the extent to which the two wheels may be brought together or, alternatively, they are provided with toggle links which have intermediate joints or separable joints. The use of intermediate joints in the toggle links requires special handling to "break" the joints when collapsing the cart and the use of separable joints not only requires special handling but also necessitates special knowledge derived from detailed instructions for manipulation of the cart.

The present invention is also designed to overcome this latter described limitation that is attendant upon the use of present day carts and, accordingly, it affords a novel caster control mechanism which is automatically operable to maintain a constant caster angle for the two supporting wheels so that these wheels will be maintained in parallelism during the collapsing movements of the cart and which mechanism is relatively simple in its construction and occupies but little space in the cart assembly. The caster control mechanism of the present invention is characterized particularly by the use of extremely short stub axles for the wheels and relatively short axle supports so that the two wheels may be brought into close proximity to each other when the cart is folded.

The provision of a golf bag cart of the character briefly outlined above and possessing the stated advantages thereof being among the principal objects of the invention, another object is to provide such a cart in which the various parts thereof may be locked in intermediate folded positions in order that the supporting wheels thereof may be moved inwardly of the cart predetermined distances to thus lessen the overall confines of the cart assembly and enable the same, for example, to be pulled through restricted or narrow spaces without destroying the stable equilibrium of the cart and its contents.

The provision of a cart which is relatively simple in its construction; one which requires no particular skill for its manipulation; one which is comprised of a minimum number of moving parts and which therefore is unlikely to get out of order; one which in the main may be constructed of tubular rod stock, light sheet metal stampings and simple castings and which therefore may be manufactured at a low cost; one which is rugged and durable and which may therefore be subjected to rough usage; one which is easily assembled or disassembled for purposes of inspection, replacement or repair; one which is pleasing in its appearance and design, and one which otherwise is well adapted to perform the services required of it are further desirable features that have been borne in mind in the production and development of the present invention.

Other objects and advantages of the invention, not at this time enumerated, will become more readily apparent as the nature of the invention is better understood.

In the accompanying three sheets of drawings forming a part of this specification, a preferred embodiment of the invention has been shown.

In these drawings:

Fig. 1 is a rear perspective view of a collapsible golf cart constructed in accordance with the principles of the present invention and showing the same in its erected or extended position of use;

Fig. 2 is a sectional view taken substantially along the horizontal plane indicated by the line 2—2 of Fig. 1;

Fig. 6 is an enlarged fragmentary rear perspective view of the structural parts of the cart assembly in the vicinity of the upper end of the main frame bar and showing the positions which they assume when the cart is in its folded or collapsed condition;

Fig. 7 is an enlarged sectional view taken substantially along the line 7—7 of Fig. 1; and Fig. 8 is an enlarged sectional view taken substantially along the line 8—8 of Fig. 1.

Figure 3:
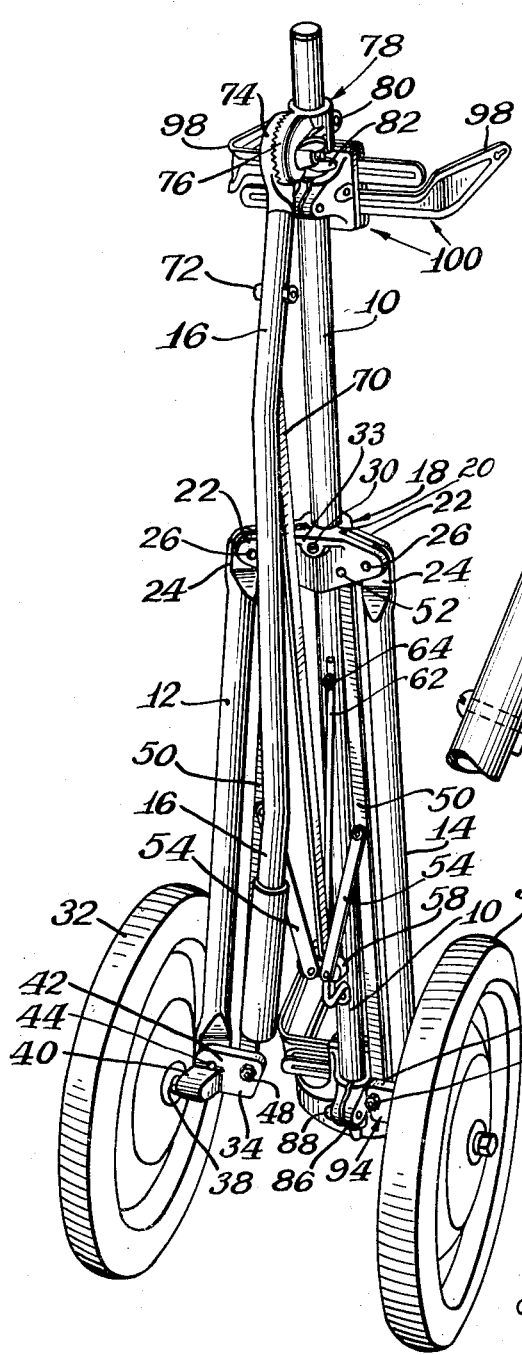
Fig. 3 is a rear perspective view of the golf cart of Fig. 1 showing the same in its folded or collapsed condition.

Referring now to the drawings in detail and in particular to Figs. 1 and 3, in the illustrated form of the invention the golf bag cart involves in its general organization four principal frame members including a main frame member 10, a pair of side frame members 12 and 14, and a handle bar 16. Each of these members is preferably in the form of an elongated hollow tubular bar for purposes of lightness and strength, although it will be understood that these members may be formed of solid rod stock if desired. The two side members 12 and 14, as well as the handle bar 16, are collapsible upon the main frame member in a manner that will be described presently.

Mounted on the main frame member 10 medially of its ends is an attachment bracket 18 of spider-like design (see Fig. 2) having a central hub portion 20 through which the frame member 10 extends and a pair of radially extending diverging split clamping arms 22. The upper ends of the side frame members 12 and 14 are flattened as at 24 and extend between the split sections of the respective clamping arms 22 where they are pivotally secured for swinging movement relative to the bracket 18 by means of rivets 26 or the like. A strengthening web 28 extends between the clamping arms 22 and receives therethrough an anchoring screw 30 by means of which the bracket 18 may be secured to the main frame member 10 in its proper medial position.

As will be described in detail subsequently, the free or lower ends of the side frame members 12 and 14 have mounted thereon a pair of supporting wheels 32 which are rotatably carried on unitary axle supports 34. The lower end of the main frame member 10 has mounted thereon a combined foot member and golf bag supporting assembly designated in its entirety at 36. It will be seen therefore that the three frame members 10, 12 and 14, together with the wheels 32 and foot assembly 36 carried thereby constitute, in effect, a tripod support capable when in its extended condition of maintaining the golf cart as a whole in stable equilibrium from a supporting surface, as for example the ground.

The wheels 32 may be of conventional design and each wheel is rotatably supported on a short stub shaft 38 integrally formed on one of the axle supports 34. Each support 34 is in the form of a unitary casting having a hub portion 40 from which the stub shaft 38 extends, and an attachment plate 42 which is offset from the hub portion. The inner reigon of the attachment plate 42 adjacent the hub portion 40 is pivotally secured as at 44 to the free end of one of the side frame members 12 or 14, as the case may be, the end of the frame member being flattened as at 46 for attachment purposes. The outer end of the plate 42 is pivoted as at 48 to one end of a caster link 50 which extends in parallelism to the frame member and the other end of which extends between the split sections of one of the radial arms 22 of the bracket 18 and is pivotally secured therebetween as at 52.

As best seen in Fig. 1, each side frame member 12, 14, together with its adjacent parallel caster link 50, attachment plate 42 and a portion of one of the radial arms 22, constitutes in effect a parallelogram structure, the legs of which are pivotally connected together in such a manner that a caster angle of substantially zero will be maintained for each wheel regardless of whether the frame members 12 and 14 are in their extended or their collapsed positions.

The side frame members 12 and 14 are maintained in their extended positions by means of a pair of toggle links 54 (Figs. 1, 3, 4 and 5) the inner or adjacent ends of which are pivoted as at 56 to a slidable bracket 58 and the outer or remote ends of which are pivoted as at 60 to the medial regions of the caster links 50 respectively. The bracket 58 is slidably supported on a guide rod 62 secured to the rear side of the main frame member 10 by means of anchoring screws 64. The guide rod 62 has its effective guide portion extending at an acute angle from the axis of the frame member 10 in such a manner that there is a gradual displacement of the rod progressively toward the lower end of the latter for a purpose that will appear presently.

It is to be noted that the radially extending split arms 33 of the bracket 18 extend outwardly from each other at an angle of approximately 120° (see Fig. 2) so that the bracket constitutes the top or crown portion of a tripod support including the three frame members 12, 14 and 16 as previously stated. The frame members 12 and 14 are thus constrained to swing relative to the frame member 10 in different planes arranged at an angle of 120° to each other. According to the present invention, the angularity of the toggle links 54 and the inclination of the guide rod 62 with respect to the axis of the main frame member 10 is calculated according to engineering exigencies so that there is no stress upon either the links 54 or the caster links 50 to which they are attached when the frame members are moved between their fully extended and their fully collapsed or folded positions. Since the bracket 58 is freely slidable on the guide rod 62, when downward thrust is exerted upon the inner or adjacent ends of the toggle links 54, by mechanism subsequently to be described, immediate unrestrained collapse of the golf bag cart will be effected unopposed by frictional forces in the linkage mechanism of the cart assembly.

Figure 4:
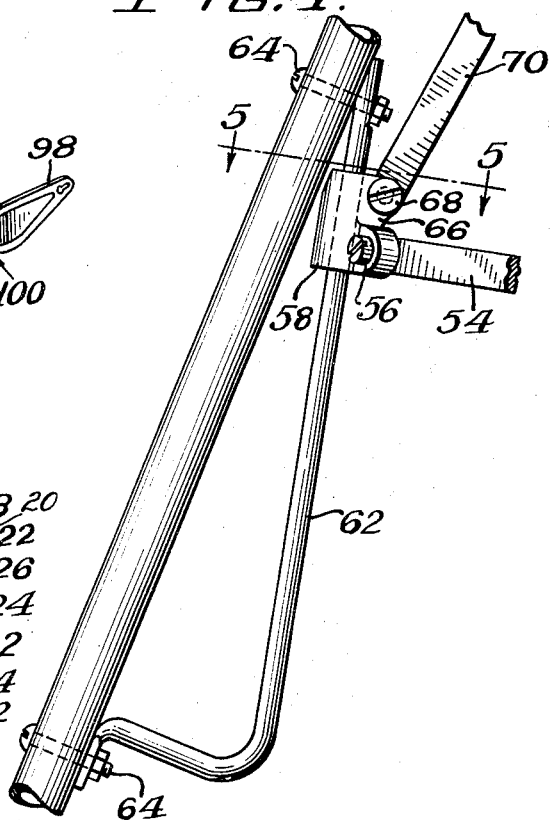
Fig. 4 is an enlarged fragmentary side elevational view of a portion of the main frame bar in the vicinity of an attached guide bracket employed in connection with the present invention.
Figure 5:
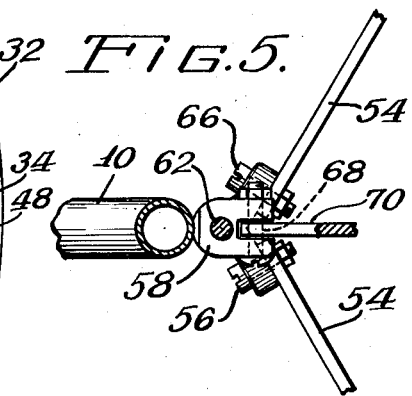
Fig. 5 is a sectional view taken substantially along the line 5—5 of Fig. 4.

As best seen in Figs. 1, 4 and 5, the bracket 58 is formed with a bifurcated portion 66 within which there is pivoted as at 68 the lower end of a thrust link 70. The upper end of the thrust link 70 is pivotally secured as at 72 (Figs. 1 and 3) to the handle bar 16 near the inner end thereof. The extreme inner end of the handle bar 16 is formed with a generally circular radially toothed clutch hub 74 designed for cooperation with a similarly toothed clutch hub 76 integrally formed on a bracket 78 telescopically received on the main frame member 10 and secured thereto adjacent the top of the latter by means of an anchoring screw 80. A stud and wing nut assembly 82 extends through the clutch hubs 74 and 76 and affords a means for clamping the two hubs together in any desired position of angular adjustment.

From the above description, it will be seen that the handle bar 16 is movable between an elevated or extended position wherein the bracket 58 carried at the lower end of the thrust link 70 assumes a position near the top of the guide rod 62 to a lowered or collapsed position wherein the bracket 58 assumes a position adjacent the bottom of the guide rod 62.

The previously mentioned combined foot member and golf bag supporting assembly 36 may be of any desired type but in the illustrated form it consists of a base support 84 of spider-like design (Figs. 1 and 7) and which has formed along its rear edge a split clamping bracket 86 which straddles the lower end region of the main frame member 10 and is tightened thereon by means of a clamping screw 88. The support 84 extends forwardly of the frame member 10 and is adapted to support thereon and bear the weight of a golf bag. In order to prevent lateral shifting of the lower end of the golf bag on the support 84, a pair of forwardly extending bag-engaging arms 90 are positioned slightly above the level of the support 84 and have laterally turned rear portions 92 which overlap each other in a vertical plane and are adapted to be secured in any desired position of adjustment by means of a clamping plate which cooperates with the forwardly facing surface of the bracket 86 in retaining the laterally turned portions 92 therebetween. A pair of clamping screws 94 serve to effect the clamping action. The forward ends of the bag-engaging arms 90 are preferably formed with bayonet slots 96 designed for cooperation with suitable studs carried at the ends of a flexible retaining strap (not shown) which may be employed to more securely hold the lower end of the gold bag in position between the arms 90.

The upper end of the golf bag is adapted to be held in position in the golf bag cart by means of a pair of bag-engaging arms 98 associated with a retaining assembly designated in its entirety at 100 and which is substantially identical with the lower bag-retaining assembly just described and which therefore needs no further description.

In the operation of the present golf bag cart, the golf bag is capable of ready attachment to the cart when the same is in either its extended or its collapsed condition. In some cases, the golf bag may be left attached to the collapsed cart and stored together therewith. In either event, the operation of erecting or of collapsing the cart is substantially the same.

When it is desired to bring the various parts of the cart assembly from their collapsed condition to their extended condition, it is merely necessary to pull the handle bar 16 away from its position of substantial parallelity with the main frame member 10. Ordinarily the cart will be resting in a prone position on the ground or other supporting surface so that the operator may reach down and engage the handle to lift it vertically and cause the same to swing about its pivotal axis, i.e. the axis of the clutch assembly 74, 76. The inherent weight of the remainder of the cart structure, coupled with the weight of the golf bag and its contents, if in position on the collapsed cart, will make it unnecessary for the operator to use both hands to spread the tripod elements 10, 12 and 14 apart. Elevation of the handle bar 16 will exert tension on the link 70 and cause the bracket 58 to be slid longitudinally along the guide rod 62 and to carry with it the inner or adjacent ends of the two toggle links 54. These links 54, operating in the manner of thrust members, will spread the caster links 50 to which they are pivotally attached apart and, in so moving, the three movable sides of the respective parallelogram structures 50, 42 and 12 or 14 (as the case may be) will move relative to the bracket 18 and cause the frame members 12 and 14 to be spread apart, thus moving the two wheels 32 in opposite directions away from each other so that the cart structure may assume the condition in which it is illustrated in Fig. 1.

During movement of the frame members 12 and 14 and their attached wheels 32 outwardly toward their fully extended positions, the attachment plates 42 will remain parallel to the respective bracket arms 22 with which they form a parallelogram structure, thus preserving the zero caster angle of the wheels in all intermediate and extreme positions of the parts.

When the various parts have assumed their fully extended positions with the handle bar 16 elevated to its fullest extent and with the guide bracket 58 positioned adjacent the upper end of the guide rod 62, the clutch wing nut and stud assembly 82 may be tightened to draw the clutch hubs 74 and 76 into firm clamping engagement and thus lock the golf bag cart in its erected condition. In this condition the assembly may have a degree of stable equilibrium on the supporting surface with the wheels 32 and foot member 36 affording the three supporting points.

In order to collapse the golf bag cart structure, with or without the golf bag and its contents in position on the cart, it is merely necessary to loosen the wing nut and stud assembly 82 so that the clutch hubs 74 and 76 may rotate relative to each other and, thereafter, downward swinging movement of the handle bar 16 will bring the various parts to the positions wherein they are illustrated in Fig. 3 and wherein the cart is fully collapsed. In so collapsing the cart, it will be unnecessary for the operator to use both hands in order to apply a reaction force to the main frame member 10 inasmuch as the angle of inclination of the guide rod 62 relative to the axis of the frame member 10 is such as to eliminate torsional stresses on the toggle links 50 as previously described.

It is to be noted that inasmuch as the caster angle of the axle-supporting members 34 remains at all times substantially zero, a more compact collapsed structure than has heretofore been attainable with conventional carts is made possible.

The invention is not to be limited to the exact arrangement of parts shown in the accompanying drawings or described in this specification since various changes in the details of construction may be resorted to without departing from the spirit of the invention. Only insofar as the invention has particularly been pointed out in the accompanying claims is the same to be limited.

We claim:

1. In a golf cart having a main frame, means for detachably supporting a golf bag thereon, a pair of rear wheels mounted on side frame assemblies operatively connected pivotally to said frame and a handle operatively connected to said frame and to said wheel assemblies, means operated by raising or lowering said handle for adjusting the spread between said rear wheels while maintaining them in substantially vertical position parallel to each other and operable as rotatable carriers for said cart at both an unfolded position and a folded position and all positions therebetween, said spread adjusting means comprising a pair of toggle links pivoted at their outer ends respectively to said side frame assemblies in the medial regions of the latter, a guide bracket pivoted to the inner end of each toggle link, and guide means on said main frame member constraining said guide bracket to slide in a linear path disposed in the fore and aft vertical plane of said main frame member and at an angle to the axis of the latter, the angle of said path being such that during movement of said side frame assemblies between their extended and collapsed positions the inner ends of said toggle links are constrained to follow the normal loci of movement afforded by their pivotal operative connection to said main frame.

2. In a golf bag cart, the wheel spread adjusting means set forth in claim 1 wherein said guide means is in the form of an elongated guide rod, said guide bracket encompassing said guide rod and being longitudinally slidable thereon.

3. A golf cart adapted to detachably support a golf bag and having a main frame, a pair of rear wheels mounted on side frame assemblies operatively connected to said main frame and adapted to be folded and unfolded by lowering and raising a handle pivotally connected to said main frame, while maintaining said wheels parallel to each other in vertical positions and operative as rotatable carriers for said cart at all positions of spread between said wheels, means operated by said handle for adjusting the spread between said wheels comprising a pair of toggle links pivoted at their outer ends respectively to said side frame assemblies in the medial regions of the latter, a guide bracket pivoted to the inner end of each toggle link, guide means on said main frame member constraining said guide bracket to slide in a linear path disposed in the fore and aft vertical plane of said main frame member and at an angle to the axis of the latter, the angle of said path being such that during movement of said side frame assemblies the inner ends of said toggle links are constrained to follow the normal loci of movement afforded by their pivotal connection to the main frame assemblies, a combined handle and drawbar pivotally connected to said main frame member, and a thrust link operatively connecting said drawbar and guide bracket.

4. In a golf bag cart, the spread adjusting means set forth in claim 3 wherein said guide means is in the form of an elongated guide rod, said guide bracket encompassing said guide rod and being longitudinally slidable thereon.

5. In a golf bag cart having a handle, a main frame and a pair of foldable wheel assemblies, means for adjusting the spread between said wheels while maintaining them in vertical parallel positions, said spread adjusting means comprising a pair of rear side frame members pivoted at their upper ends to said main frame member for swinging movements in different respective radial planes between extended positions wherein the lower ends of said side members are remote from the main frame member to folded positions wherein said ends are in close proximity to the latter, an axle support pivoted to the lower end of each side frame member, a caster link pivoted at its lower end to each axle support and pivoted at its upper end to the main frame member, the pivotal connections for said caster links being spaced from the pivotal connections for the respective side frame members, a pair of toggle links pivoted at their outer ends respectively to said caster links in the medial regions of the latter, a guide bracket pivoted to the inner end of each toggle link, and guide means on said main frame member constraining said guide bracket to slide in a linear path disposed in the fore and aft vertical plane of said main frame member and at an angle to the axis of the latter, the angle of said path being such that during movement of said caster links and side frame members the inner ends of the toggle links are constrained to follow the normal loci of movement afforded by their pivotal connection to the caster links.

References Cited in the file of this patent

UNITED STATES PATENTS

| 2,626,814 | Chamberlin | Jan. 27, 1953 |
| 2,806,709 | Watson | Sept. 17, 1957 |

FOREIGN PATENTS

| 679,485 | Great Britain | Sept. 17, 1952 |